United States Patent [19]

Charbonneau et al.

[11] Patent Number: 6,063,464
[45] Date of Patent: *May 16, 2000

[54] ISOSORBIDE CONTAINING POLYESTERS AND METHODS FOR MAKING SAME

[75] Inventors: Larry F. Charbonneau, Mendham; Robert E. Johnson, Hoboken, both of N.J.; Helmut B. Witteler, Beindersheim, Germany; Garo Khanarian, Berkeley Heights, N.J.

[73] Assignee: HNA Holdings, Inc., Warren, N.J.

[*] Notice: This patent is subject to a terminal disclaimer.

[21] Appl. No.: 09/064,720

[22] Filed: Apr. 23, 1998

[51] Int. Cl.[7] .......................... B29D 22/00; C08G 63/02; G03C 5/00

[52] U.S. Cl. .................. 428/36.92; 528/176; 528/180; 528/272; 528/275; 528/298; 528/300; 528/302; 528/307; 528/308; 528/308.6; 524/81; 524/779; 428/364; 428/35.7; 430/321

[58] Field of Search ..................................... 528/176, 272, 528/275, 298, 300, 302, 307, 308, 308.6, 180; 524/779, 81; 428/364, 35.7, 36.92; 430/321

[56] References Cited

U.S. PATENT DOCUMENTS

| | | |
|---|---|---|
| 2,985,995 | 5/1961 | Bunting, Jr. et al. . |
| 3,199,281 | 8/1965 | Maerov et al. . |
| 3,684,766 | 8/1972 | Jackson, Jr. et al. . |
| 3,871,947 | 3/1975 | Brekken . |
| 3,966,867 | 6/1976 | Munting . |
| 4,146,663 | 3/1979 | Ikeda et al. . |
| 4,157,419 | 6/1979 | Mirhej . |
| 4,159,617 | 7/1979 | Allan . |
| 4,195,161 | 3/1980 | Davis et al. . |
| 4,209,559 | 6/1980 | Wada et al. . |
| 4,223,128 | 9/1980 | Halek et al. . |
| 4,225,549 | 9/1980 | Allan . |
| 4,231,922 | 11/1980 | Robeson . |
| 4,246,381 | 1/1981 | Robeson . |
| 4,255,301 | 3/1981 | Minagawa et al. . |
| 4,259,458 | 3/1981 | Robeson . |
| 4,259,478 | 3/1981 | Jackson, Jr. et al. . |
| 4,294,956 | 10/1981 | Berger et al. . |
| 4,294,957 | 10/1981 | Berger et al. . |
| 4,351,917 | 9/1982 | Calundann et al. . |
| 4,352,927 | 10/1982 | Cogswell et al. . |
| 4,355,080 | 10/1982 | Zannucci . |
| 4,374,239 | 2/1983 | Berger et al. . |
| 4,383,051 | 5/1983 | Meyborg et al. . |
| 4,386,186 | 5/1983 | Maresca et al. . |
| 4,408,061 | 10/1983 | Salzburg et al. . |
| 4,413,116 | 11/1983 | Reuter et al. . |
| 4,418,174 | 11/1983 | Dhein et al. . |
| 4,435,562 | 3/1984 | Sullivan et al. . |
| 4,439,586 | 3/1984 | Kawakami et al. . |
| 4,456,729 | 6/1984 | Dhein et al. . |
| 4,474,918 | 10/1984 | Seymour et al. . |
| 4,506,066 | 3/1985 | Medem et al. . |
| 4,526,923 | 7/1985 | Hornbaker et al. . |
| 4,551,520 | 11/1985 | Morris et al. . |
| 4,557,982 | 12/1985 | Nouda et al. . |
| 4,587,071 | 5/1986 | Minami et al. . |
| 4,663,415 | 5/1987 | Grögler et al. . |
| 4,687,830 | 8/1987 | Weber et al. . |
| 4,713,436 | 12/1987 | Downs et al. . |
| 4,725,647 | 2/1988 | Maresca et al. . |
| 4,805,788 | 2/1989 | Akiho . |
| 4,814,426 | 3/1989 | Utsumi et al. . |
| 4,863,046 | 9/1989 | Collette et al. . |
| 4,993,566 | 2/1991 | Eberle . |
| 4,993,567 | 2/1991 | Eberle, Jr. . |
| 5,005,716 | 4/1991 | Eberle . |
| 5,021,289 | 6/1991 | Light et al. . |
| 5,108,675 | 4/1992 | Matsuo et al. . |
| 5,120,822 | 6/1992 | Hoeschele et al. . |
| 5,124,388 | 6/1992 | Pruett et al. . |
| 5,141,120 | 8/1992 | Brown et al. . |
| 5,141,121 | 8/1992 | Brown et al. . |
| 5,153,302 | 10/1992 | Masuda et al. . |
| 5,164,478 | 11/1992 | Lee et al. . |
| 5,179,143 | 1/1993 | König et al. . |
| 5,296,550 | 3/1994 | Natarajan et al. . |
| 5,321,056 | 6/1994 | Carson et al. . |
| 5,382,474 | 1/1995 | Adhya et al. . |
| 5,409,967 | 4/1995 | Carson et al. . |
| 5,412,005 | 5/1995 | Bastioli et al. . |
| 5,484,632 | 1/1996 | Mercer, Jr. et al. . |
| 5,496,887 | 3/1996 | Braune . |
| 5,596,888 | 1/1997 | McLarty, III et al. . |
| 5,607,757 | 3/1997 | Dalton . |
| 5,616,404 | 4/1997 | Sublett . |
| 5,646,236 | 7/1997 | Schafheutle et al. . |
| 5,648,152 | 7/1997 | Diaz-Kotti et al. . |
| 5,654,083 | 8/1997 | Venema . |
| 5,656,719 | 8/1997 | Stibal et al. . |
| 5,709,929 | 1/1998 | Venema . |
| 5,721,397 | 2/1998 | Weinberg . |
| 5,747,175 | 5/1998 | Dietz et al. . |

FOREIGN PATENT DOCUMENTS

| | | |
|---|---|---|
| 96/38282 | 12/1996 | European Pat. Off. . |
| 96/38498 | 12/1996 | European Pat. Off. . |
| 97/00284 | 1/1997 | European Pat. Off. . |
| 1263981 | 3/1968 | Germany . |
| 195 19 577 | 5/1995 | Germany . |
| 195 19 578 | 5/1995 | Germany . |
| 195 28 336 | 8/1995 | Germany . |
| 195 04 913 | 8/1996 | Germany . |
| 195 38 700 | 4/1997 | Germany . |
| 1079686 | 8/1967 | United Kingdom . |

OTHER PUBLICATIONS

Chemical Abstracts vol. 62, col. 10588, Neth. App. 6,405, 497 (1965).

(List continued on next page.)

*Primary Examiner*—Samuel A. Acquah
*Attorney, Agent, or Firm*—Burns, Doane, Swecker & Mathis, L.L.P.

[57] ABSTRACT

A polyester polymer and method for making the polyester, wherein the polyester is prepared by (1) combining in a reactor a monomer containing a diacid moiety; a monomer comprising a diol moiety; and a monomer containing an isosorbide moiety; with a condensation catalyst suitable for condensing aromatic diacids and diols; and (2) heating the monomers and catalyst to polymerize the monomers to yield a polyester having an inherent viscosity of at least about 0.15 dL/g.

36 Claims, No Drawings

OTHER PUBLICATIONS

*Encyclopaedic Dictionary of Commercial Polymer Blends*, Ed. L.A. Utracki, ChemTec Publishing, pp. 10–11, 23, 35–43 (1994).

"Plastics processing," *McGraw–Hill Encyclopedia of Science & Technology*, 6$^{th}$ Edition, pp. 35–40 (1987).

"Plastics Processing," *The Way Things Work*, vol. 2, pp. 56–59 (1971).

*Polymer Alloys and Blends:Thermodynamics and Rheology*, Ed. L.A. Utracki, Hanser Publishers, pp. 256–270, 275–280, 287–293, 297–299 (1990).

*Polymeric Materials Encyclopedia*, "Polyesters (Derived from Renewable Sources)" vol. 8, pp. 5891–96, CPC Press, Inc. (1996).

Dietrich Braun and Matthias Bergmann "1,4:3,6–Dianhydrohexite als Bausteine Für Polymere" J. prakt. Chem. 334, p. 298–310 (1992).

Hans R. Kricheldorf, "'Sugar Diols' as Building Blocks of Polycondensates," J.M.S.—Rev. Macromol. Chem. Phys., C37(4), pp. 599–631 (1997).

Reinhard Storbeck, Matthias Rehahn and Matthias Ballauff, "Synthesis and properties of high–molecular–weight polyesters based on 1,4:3,6–dianhydrohexitols and terephthalic acid," Makromol. Chem. 194, pp. 53–64 (1993).

Reinhard Storbeck, "*Synthese und Charakterisierung von Polyestern auf Basis nachwachsender Rohstoffe*," Dissertation, Universität Karlsruhe, 1994.

Reinhard Storbeck and Matthias Ballauff, "Synthesis and Thermal Analysis of Copolyesters Deriving from 1,4:3, 6–Dianhydrosorbitol, Ethylene Glycol, and Terephthalic Acid," Journal of Applied Polymer Science, vol. 59, pp. 1199–1202 (1996).

D. Braun et al., "Polyesters with 1.4:3.6–dianhydrosorbitol as polymeric plasticizers for PVC," Die Angewandte Makromolekulare Chemie 199, pp. 191–205 (1992).

D. Braun et al., "Grafting of polyesters by free–radical chain transfer," Die Angewandte Makromolekulare Chemie 210, pp. 173–196 (1993).

Estelle Cognet–Georjon et al., "New polyurethanes based on diphenylmethane diisocyanate and 1,4:3,6–dianhydrosorbitol, 1," Macromol. Chem. Phys. 196, pp. 3733–3751 (1995).

Estelle Cognet–Georjon et al., "New polyurethanes based on 4,4'–diphenylmethane diisocyanate and 1,4:3,6 dianhydrosorbitol, 2$^{a)}$" Macromol. Chem. Phys. 197, pp. 3593–3612 (1996).

Hans R. Kricheldorf et al., "Chiral thermotropic copoly(ester–imide)s based on isosorbide$^{b)}$ and N–(4–carboxyphenyl)trimellitimide," Macromol. Rapid Commun. 16, pp. 231–237 (1995).

Hans R. Kricheldorf et al., "New Polymer Syntheses. LXXXII. Syntheses of Poly(ethersulfone)s from Silylated Aliphatic Diols Including Chiral Monomers," Journal of Polymer Science: Part A: Polymer Chemistry, vol. 33, pp. 2667–2671 (1995).

Hans R. Kricheldorf et al., "LC–polyimides 26. Photoreactive, nematic or cholesteric poly(ester–imide)s derived from 4–aminocinnamic acid trimellitimide, isosorbide and various diphenols," High Perform. Polym., 7, pp. 471–480 (1995).

Hans R. Kricheldorf et al., "Cholesteric and photoreactive polyesters," Reactive & Functional Polymers, 30, pp. 173–189 (1996).

Mustapha Majdoub et al., Nouveaux Polyéthers Et Polyesters Å Base D'Isosorbide: Synthèse Et Caractérisation, Eur. Polym. J., vol. 30, No. 12, pp. 1431–1437 (1994).

Masahiko Okada et al., "Synthesis and biodegradability of polyesters based on 1.4:3,6–dianhydrohexitols and sucinic acid derivatives," in *Biodegradable Plastics and Polymers*, Eds. Y. Doi and K. Fukada, Elsevier Science B.V., pp. 511–518 (1994).

Masahiko Okada et al., "Synthesis and Degradabilities of Polyesters from 1.4:3,6–Dianhydrohexitols and Aliphatic Dicarboxylic Acids," Journal of Polymer Science: Part A: Polymer Chemistry, vol. 33, pp. 2813–2820 (1995).

Masahiko Okada et al., "Biodegradable Polymers Based on Renewable Resources: Polyesters Composed of 1,4:3,6–Dianhydrohexitol and Aliphatic Dicarboxylic Acid Units," Journal of Applied Polymer Science, vol. 62, pp. 2257–2265 (1996).

Martin Reinecke and Helmut Ritter, "Branching and crosslinking of an unsaturated oligoester with furfurylamides and sorbic acid amides via Diels–Alder additions," Makromol. Chem. 194 pp. 2385–2393 (1993).

Joachim Thiem et al., "Synthesis of Polyterephthalates Derived from Dianhydrohexitols, " Polymer Bulletin 11, pp. 365–369 (1984).

J. Thiem et al., "Darstellung und gezielte Polykondensation von Anhydroalditol–Bausteinen aus Stärke", starch/stärke, 36, Nr.5, pp. 170–176 (1984).

Sirinat Wilbullucksanakul et al., "Synthesis of polyurethanes from saccharide–derived diols and diisocyantes and their hydrolyzability," Macromol. Chem., Phys. 197, pp. 135–146 (1996).

V.L. Lapenkov et al., "Polyvinyl ethers of dianhydro derivatives of mannitol and sorbitol," Ref. Zh., Khim. 1973, Abstr. No. 15S298.

Stanislaw Ropuszynski et al., "Preparation of oxyethylene derivatives of esters of dianhydroglucitol and some higher fatty acids and study of their properties," Abstract; Pr. Nauk. Inst. Technol. Org. Tworzyw Sztucznych Politech. Wroclaw., No. 3, pp. 15–38 (1971) with Abstract.

ISOSORBIDE CONTAINING POLYESTERS AND METHODS FOR MAKING SAME

RELATED APPLICATIONS

The following copending applications, filed on even date herewith, all contain related subject matter: U.S. application Ser. Nos.: 09/064,844 [Attorney Docket No. 032358-001], 09/064,950 [Attorney Docket No. 032358-002], 09/064,846 [Attorney Docket No. 032358-003], 09/064,858 [Attorney Docket No. 032358-004], 09/064,826 [Attorney Docket No. 032358-005], 09/064,719 [Attorney Docket No. 032358-006] and 09/064,862 [Attorney Docket No. 032358-007]. The contents of each of the above-identified applications is hereby incorporated by reference.

FIELD OF THE DISCLOSURE

This disclosure relates to polyesters and methods of making polyesters, and more specifically to polyesters containing an isosorbide moiety, and methods of making them.

BACKGROUND OF THE DISCLOSURE

The diol 1,4:3,6-dianhydro-D-sorbitol, referred to hereinafter as isosorbide, the structure of which is illustrated below, is readily made from renewable resources, such as sugars and starches. For example, isosorbide can be made from D-glucose by hydrogenation followed by acid-catalyzed dehydration.

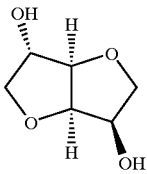

Isosorbide has been incorporated as a monomer into polyesters that also include terephthaloyl moieties. See, for example, R. Storbeck et al, *Makromol.Chem.,* Vol. 194, pp. 53–64 (1993); R. Storbeck et al, *Polymer,* Vol. 34, p. 5003 (1993). However, it is generally believed that secondary alcohols such as isosorbide have poor reactivity and are sensitive to acid-catalyzed reactions. See, for example, D. Braun et al., *J. Prakt.Chem.,* Vol. 334, pp. 298–310 (1992). As a result of the poor reactivity, polyesters made with an isosorbide monomer and esters of terephthalic acid are expected to have a relatively low molecular weight. Ballauff et al, Polyesters (Derived from Renewable Sources), Polymeric Materials Encyclopedia, Vol. 8, p. 5892 (1996).

Copolymers containing isosorbide moieties, ethylene glycol moieties, and terephthaloyl moieties have been reported only rarely. A copolymer containing these three moieties, in which the mole ratio of ethylene glycol to isosorbide was about 90:10, was reported in published German Patent Application No. 1,263,981 (1968). The polymer was used as a minor component (about 10%) of a blend with polypropylene to improve the dyeability of polypropylene fiber. It was made by melt polymerization of dimethyl terephthalate, ethylene glycol, and isosorbide, but the conditions, which were described only in general terms in the publication, would not have given a polymer having a high molecular weight.

Copolymers of these same three monomers were described again recently, where it was observed that the glass transition temperature Tg of the copolymer increases with isosorbide monomer content up to about 200° C. for the isosorbide terephthalate homopolymer. The polymer samples were made by reacting terephthaloyl dichloride in solution with the diol monomers. This method yielded a copolymer with a molecular weight that is apparently higher than was obtained in the German Patent Application described above but still relatively low when compared against other polyester polymers and copolymers. Further, these polymers were made by solution polymerization and were thus free of diethylene glycol moieties as a product of polymerization. See R. Storbeck, Dissertation, Universität Karlsruhe (1994); R. Storbeck, et al., *J. Appl. Polymer Science,* Vol. 59, pp.1199–1202 (1996).

U.S. Pat. No. 4,418,174 describes a process for the preparation of polyesters useful as raw materials in the production of aqueous stoving lacquers. The polyesters are prepared with an alcohol and an acid. One of the many preferred alcohols is dianhydrosorbitol. However, the average molecular weight of the polyesters is from 1,000 to 10,000, and no polyester actually containing a dianhydrosorbitol moiety was made.

U.S. Pat. No. 5,179,143 describes a process for the preparation of compression molded materials. Also, described therein are hydroxyl containing polyesters. These hydroxyl containing polyesters are listed to include polyhydric alcohols, including 1,4:3,6-dianhydrosorbitol. Again, however, the highest molecular weights reported are relatively low, i.e., 400 to 10,000, and no polyester actually containing the 1,4:3,6-dianhydrosorbitol moiety was made.

Published PCT Applications WO 97/14739 and WO 96/25449 describe cholesteric and nematic liquid crystalline polyesters that include isosorbide moieties as monomer units. Such polyesters have relatively low molecular weights and are not isotropic.

SUMMARY OF THE DISCLOSURE

Contrary to the teachings and expectations that have been published in the prior art, isotropic, i.e., semi-crystalline and amorphous or nonliquid crystalline, copolyesters containing aromatic or alicyclic diacid moieties, diol moieties and isosorbide moieties are readily synthesized in molecular weights that are suitable for making fabricated products, such as films, beverage bottles, molded products, sheets and fibers on an industrial scale.

The process conditions of the present invention, particularly the amounts of monomers used, depend on the polymer composition that is desired. The amount of monomer is desirably chosen so that the final polymeric product contains the desired amounts of the various monomer units, desirably with equimolar amounts of monomer units derived from a diol and a diacid. Because of the volatility of some of the monomers, including isosorbide, and depending on such variables as whether the reactor is sealed (i.e. is under pressure) and the efficiency of the distillation columns used in synthesizing the polymer, some of the monomers are desirably included in excess at the beginning of the polymerization reaction and removed by distillation as the reaction proceeds. This is particularly true of diols including isosorbide.

In the polymerization process, the monomers are combined, and are heated gradually with mixing with a catalyst or catalyst mixture to a temperature in the range of about 260° C. to about 300° C., desirably 280° C. to about 285° C. The catalyst may be included initially with the reactants, and/or may be added one or more times to the mixture as it is heated. The catalyst used may be modified as the reaction proceeds. The heating and stirring are continued for a sufficient time and to a sufficient temperature, generally with removal by distillation of excess reactants, to yield a molten polymer having a high enough molecular weight to be suitable for making fabricated products.

In a preferred embodiment, diacid moieties are present in the polymer in an amount of about 50 mole % (mole % of the total polymer), diol moieties other than isosorbide are present in amounts of about 5 mole % to about 49.75 mole %, and isosorbide moieties are present in the polymer in amounts of about 0.25 mole % to about 45 mole %. Of course, all of the percentages are dependent on the particular application desired. Desirably, however, equimolar amounts of diacid monomer units and diol monomer units are present in the polymer. This balance is desirable to achieve a high molecular weight.

The polyester has an inherent viscosity, which is an indicator of molecular weight, of at least about 0.35 dL/g, as measured on a 1% (weight/volume) solution of the polymer in o-chlorophenol at a temperature of 25° C. This inherent viscosity is sufficient for some applications, such as some optical articles and coatings. For other applications, such as compact discs, an inherent viscosity of at least about 0.4 dL/g is preferred. Higher inherent viscosities, such as at least about 0.5 dL/g are needed for many other applications (e.g. bottles, films, sheet, molding resin). Further processing of the polyester may achieve inherent viscosities that are even higher.

DETAILED DESCRIPTION OF THE PREFERRED EMBODIMENTS OF THE DISCLOSURE

The isotropic polyester polymer, described in detail below, may be made by the melt condensation of a combination of monomers containing a diol moiety, an isosorbide moiety and a diacid moiety. Small amounts of other monomers may be added during the polymerization or may be produced as by-products during the reaction.

In a preferred embodiment, the number of aromatic or alicyclic diacid moieties in the polymer is about 50 mole % (mole % of the total polymer). Examples of desirable diacid moieties include those derived from naphthalates, terephthalates, isophthalates and bibenzoates. Specific examples of desirable diacid moieties include isophthalic acid, 2,5-furandicarboxylic acid, 2,5-thiophenedicarboxylic acid, 2,6-naphthalenedicarboxylic acid, 2,7-naphthalenedicarboxylic acid, 3,4'- and 4,4'-diphenyl ether dicarboxylic acid, 3,4'- and 4,4'-diphenyl sulfide dicarboxylic acid, 3,4'- and 4,4'-diphenylsulfone dicarboxylic acid, 3,4'- and 4,4'-benzophenonedicarboxylic acid, 1,4-naphthalenedicarboxylic acid, 4,4'-methylene bis (cyclohexyl)dicarboxylic acid, trans-1,4-cyclohexanedicarboxylic acid, cis-1,4-cyclohexanedicarboxylic acid, 1,2-bis(4-carboxyphenoxy) ethane, 4,4'-methylene-bis(benzoic) acid, trans-4,4'-stilbenedicarboxylic acid, fumaric acid, dimer acid, resorcinoldiacetic acid, and sulfoisophthalic acid, and 4,4'-bibenzoic acid. The diacid does not need to be derived from terephthalic acid or dimethyl terephthalate or from other compounds containing a terephthaloyl moiety. Small amounts of trifunctional acids may also be employed, e.g., 1,3,5-benzenetricarboxylic acid. Further, by "aromatic" and "alicyclic", it is meant to include substituted aromatic or alicyclic compounds, e.g., aromatic compounds substituted with an aliphatic group.

In a preferred embodiment, diol monomer units are present in amounts of about 5 mole % to about 49.75 mole %, preferably 10 mole % to about 49.5 mole %, more preferably about 25 mole % to about 48 mole %, and even more preferably about 25 mole % to about 40 mole %. Diethylene glycol may be produced as a by-product of the polymerization process, and may also be added to help accurately regulate the amount of diethylene glycol monomer units that are in the polymer. Examples of desirable diol moieties include aliphatic alkylene glycols having from 3–12 carbon atoms and having the empirical formula HO—$C_nH_{2n}$—OH, where n is an integer from 3–12, for example, 1,3-propanediol, 1,4-butanediol, 1,5-pentanediol, 1,6-hexanediol, and 1,10-decanediol, also including branched diols such as 2,2-dimethyl-1,3-propanediol; cis or trans-1,4-cyclohexanedimethanol and mixtures of the cis and trans isomers; 2,2,4,4-tetramethyl-1,3-cyclobutanediol; triethylene glycol; 2,2-bis[4-(2-hydroxyethoxy)phenyl] propane; 1,1-bis[4-(2-hydroxyethoxy)phenyl]cyclohexane; 9,9-bis[4-(2-hydroxyethoxy)phenyl]fluorene; 1,4:3,6-dianhydromannitol; 1,4:3,6-dianhydroiditol; and 1,4-anhydroerythritol. Preferred diol moieties are derived from ethylene glycol, butylene glycol, propylene glycol and cyclohexanedimethanol. The diol does not need to be derived from ethylene glycol. Small amounts of alcohols with functionality >2 may also be utilized, e.g., trimethylopropane and pentaery-thritol.

In a preferred embodiment, isosorbide moieties are present in the polymer in amounts in the range of about 0.25 mole % to about 45 mole %, preferably about 0.25 mole % to about 30 mole % and more preferably about 0.5 mole % to 20 mole %. Depending on the application, isosorbide may be present in any desirable range such as 1 mole % to 3 mole %, 1 mole % to 6 mole %, 1 mole % to 8 mole % and 1 mole % to 20 mole %.

The polyester desirably has an inherent viscosity, which is an indicator of molecular weight, of at least about 0.15 dL/g, more desirably at least about 0.35 dL/g, as measured on a 1% (weight/volume) solution of the polymer in o-chlorophenol at a temperature of 25° C. These inherent viscosities are sufficient for some applications. For applications such as compact discs, an inherent viscosity of about 0.4 dL/g is preferred. Higher inherent viscosities are desirable for many other applications (e.g. bottles, films, sheet, molding resin). The conditions can be adjusted to obtain desired inherent viscosities up to at least about 0.5 and desirably higher than 0.65 dL/g. Further processing of the polyester may achieve inherent viscosities of 0.7, 0.8, 0.9, 1.0, 1.5, 2.0 dL/g and even higher.

The molecular weight is normally not measured directly. Instead, the inherent viscosity of the polymer in solution or the melt viscosity is used as an indicator of molecular weight. The inherent viscosities are an indicator of molecular weight for comparisons of samples with a polymer family, e.g., PEIT, PBT, PEN, PEIN, etc., and are used as the indicator of molecular weight herein.

The polyesters of the invention can be made by any of several methods. The product compositions vary somewhat depending on the method used, particularly in the amount of diol that is present in the polymer. These methods include the reaction of the diol monomers with the acid chlorides. The reaction of terephthaloyl dichloride with isosorbide and ethylene glycol is readily carried out by combining the monomers in a solvent (e.g., toluene) in the presence of a base, such as pyridine, which neutralizes HCl as it is produced. This procedure is described in R. Storbeck et al., *J. Appl. Polymer Science,* Vol. 59, pp. 1199 –1202 (1996). Other well-known variations using terephthaloyl dichloride may also be used (e.g. interfacial polymerization), or the monomers may simply be stirred together while heating.

When the polymer is made using the acid chlorides, the ratio of monomer units in the product polymer is about the same as the ratio of reacting monomers. Therefore, the ratio of monomers charged to the reactor is about the same as the desired ratio in the product. A stoichiometric equivalent of the diol and diacids generally will be used to obtain a high molecular weight polymer.

The polymers can also be made by a melt polymerization process, in which the acid component is either terephthalic acid or dimethyl terephthlate, and also may include the free acid or dimethyl ester of any other diacids that may be desired in the polyester polymer composition. The diacids or dimethyl esters are heated with the diols (ethylene glycol, isosorbide, optional diols) in the presence of a catalyst to a high enough temperature that the monomers combine to form esters and diesters, then oligomers, and finally polymers. The polymeric product at the end of the polymerization process is a molten polymer. The diol monomers (e.g., ethylene glycol and isosorbide) are volatile and distill from the reactor as the polymerization proceeds.

The melt process conditions of the present invention, particularly the amounts of monomers used, depend on the polymer composition that is desired. The amount of diol and diacid or dimethyl ester thereof are desirably chosen so that the final polymeric product contains the desired amounts of the various monomer units, desirably with equimolar amounts of monomer units derived from the diols and the diacids. Because of the volatility of some of the monomers, including isosorbide, and depending on such variables as whether the reactor is sealed (i.e. is under pressure) and the efficiency of the distillation columns used in synthesizing the polymer, some of the monomers may need to be included in excess at the beginning of the polymerization reaction and removed by distillation as the reaction proceeds. This is particularly true of diols including isosorbide.

The exact amount of monomers to be charged to a particular reactor is readily determined by a skilled practitioner, but often will be in the ranges below. Excesses of diacid, diol and isosorbide are often desirably charged, and the excess diacid, diol and isosorbide is desirably removed by distillation or other means of evaporation as the polymerization reaction proceeds. Isosorbide is desirably charged in an amount of about 0.25 mole % to about 150 mole % or more compared with the total amount of diacid monomers. Diols charged in an amount in the range of about 100 mole % to about 300 mole %, of the diacid monomer.

The ranges given for the monomers are very wide because of the wide variation in monomer loss during polymerization, depending on the efficiency of distillation columns and other kinds of recovery and recycle systems, and are only an approximation. Exact amounts of monomers that are charged to a specific reactor to achieve a specific composition are readily determined by a skilled practitioner.

In the polymerization process, the monomers are combined, and are heated gradually with mixing with a catalyst or catalyst mixture to a temperature in the range of about 260° C. to about 300° C., desirably 280° C. to about 285° C. The exact conditions and the catalysts depend on whether the diacids are polymerized as true acids or as dimethyl esters or diacid chloride. The catalyst may be included initially with the reactants, and/or may be added one or more times to the mixture as it is heated. The catalyst used may be modified as the reaction proceeds. The heating and stirring are continued for a sufficient time and to a sufficient temperature, generally with removal by distillation of excess reactants, to yield a molten polymer having a high enough molecular weight to be suitable for making fabricated products.

Catalysts that may be used include salts of Li, Ca, Mg, Mn, Zn, Pb, Sb, Sn, Ge, and Ti, such as acetate salts and oxides, including glycol adducts, and Ti alkoxides. These are generally known in the art, and the specific catalyst or combination or sequence of catalysts used may be readily selected by a skilled practitioner. The preferred catalyst and preferred conditions differ depending on whether the diacid monomer is polymerized as the free diacid or as a dimethyl ester or as a diacid chloride.

The monomer composition of the polymer is chosen for specific uses and for specific sets of properties. For uses where a partially crystalline polymer is desired, as for example food and beverage containers, such as hot fill or cold fill boftles, fibers, and films, the polymer will generally have a monomer composition in the range of about 0.1% to about 10%, preferably about 0.25% to about 5% on a molar basis of isosorbide moieties.

For applications where it is desirable to have an amorphous polymer, such as would be used to make transparent optical articles, the amount of isosorbide moiety is in the range of about 2% to about 30% on a molar basis.

Some of these compositions (i.e. those having isosorbide at levels of less than about 12%) are semi-crystalline if they are cooled slowly from the melt or if they are annealed above their glass transition temperatures, but are amorphous if they are cooled rapidly from the melt. In general, the compositions that can be semi-crystalline are slower to crystallize than poly(ethylene terephthalate) compositions, so that it is easier to make transparent articles that remain transparent using crystallizable copolymers even though they may be exposed to conditions under which they can crystallize.

The melt polymerization process of the present invention is desirably carried out using either dimethyl esters (e.g., dimethyl terephthalate) or diacid chlorides (e.g., terephthaloyl dichloride) as reactants or using the free diacid as a reactant. Each process has its own preferred catalysts and preferred conditions. These are described generally below. These are analogous to the well known processes for making polyesters. The usefulness of these methods in obtaining high molecular weight polymer is surprising in view of the disclosures by others who have worked with isosorbide polyesters and in view of the generally held expectations that secondary diols have low reactivities and esters of secondary alcohols have reduced thermal stability. These two processes are somewhat different and are described below.

Dimethyl Ester Process

In this process, which is carried out in two steps, diacid monomers are used as their dimethyl ester derivatives. The diols (e.g., ethylene glycol and isosorbide) are mixed with the dimethyl ester of the diacid (e.g., dimethyl terephthalate) in the presence of an ester interchange catalyst, which causes exchange of the diol for the methyl group of the dimethyl esters through a transesterification reaction. This results in the formation of methanol, which distills out of the reaction flask and a diol adduct of the diacid. Because of the stoichiometry of this reaction, somewhat more than two moles of diol are desirably added as reactants for the ester interchange reaction.

Catalysts that bring about ester interchange include salts (usually acetates) of the following metals: Li, Ca, Mg, Mn, Zn, Pb, Sn, and combinations thereof, Ti(OR)$_4$, where R is an alkyl group having 2–12 carbon atoms, and PbO. The catalyst components are generally included in an amount of about 10 ppm to about 100 ppm. Preferred catalysts for ester interchange include $Mn(OAc)_2$, $Co(OAc)_2$, and $Zn(OAc)_2$, where OAc is the abbreviation for acetate, and combinations thereof. The polycondensation catalyst in the second stage of the reaction may be added now or at the start of the polycondensation stage. A catalyst that has been used with particularly good success is based on salts of Mn(II) and Co(II), at levels of about 50 to about 100 ppm, each. These were used in the form of Mn(II) acetate tetrahydrate and CO(II) acetate tetrahydrate, although other salts of the same metals may also be used.

Ester interchange is desirably brought about by heating and stirring the mixture of reactants under an inert atmosphere (e.g. nitrogen) at atmospheric pressure from room temperature to a temperature high enough to induce the ester interchange (about 150° C.). Methanol is formed as a by-product and distills out of the reactor. The reaction is gradually heated to about 250° C. until methanol evolution stops. The end of methanol evolution can be recognized by a drop in the overhead temperature of the reaction vessel.

A small amount of an additive having a boiling point of 170–240° C. may be added to the ester interchange to aid in the heat transfer within the reaction medium and to help retain volatile components in the vessel that may sublime into the packed column. The additive must be inert and not react with alcohols or DMT at temperatures below 300° C. Preferably, the additive has a boiling point greater than 170° C., more preferably within the range of 170° C. to 240° C., and is used in an amount between about 0.05 and 10 wt %, more preferably between about 0.25 and 1 wt % of reaction mixture. A preferred additive is tetrahydronaphthalene. Other examples include diphenyl ether, diphenyl sulfone and benzophenone. Other such solvents are described in U.S. Pat. No. 4,294,956, the contents of which are hereby incorporated by reference.

The second stage of the reaction is commenced by adding a polycondensation catalyst and a sequestering agent for the transesterification catalyst. Polyphosphoric acid is an example of a sequestering agent and is normally added in an amount of about 10 to about 100 ppm of phosphorous per gm of dimethyl ester. An example of a polycondensation catalyst is antimony (III) oxide, which may be used at a level of 100 to about 400 ppm.

The polycondensation reaction is typically carried out at a temperature from about 250° C. to 285° C. During this time, diol distills out of the reaction due to condensation of the diol adduct of the diacid to form polymer and by-product ethylene glycol, which is collected as a distillate.

The polycondensation reaction described above is preferably carried out under vacuum, which can be applied while the reactor is being heated to the temperature of the polycondensation reaction after polyphosphoric acid and catalyst oxide have been added. Alternatively, vacuum can be applied after the polycondensation reaction temperature reaches 280° C.–285° C. In either case, the reaction is accelerated by the application of vacuum. Heating under vacuum is continued until the molten polymer reaches the desired molecular weight, usually recognized by an increase in the melt viscosity to a pre-determined level. This is observed as an increase in the torque needed for the stirring motor to maintain stirring. For certain composition ranges, the molecular weight can be increased further by solid state polymerization, described below.

Diacid Process

The diacid process is similar to the dimethyl ester process except that the initial esterification reaction that leads to the diol adduct of the diacid and other low molecular weight esters is carried out at a slightly elevated pressure (autogenous pressure, about 25 to 50 psig). Instead of a two-fold excess of diols, a smaller excess (about 10% to about 60%) of diols (isosorbide and other diols) is used. The intermediate esterification product is a mixture of oligomers, since not enough diol is present to generate a diester. The catalysts are also different. No added catalyst is necessary in the esterification reaction.

A polycondensation catalyst (e.g., Sb(III) or Ti(IV) salts) is still desirable to achieve a high molecular weight polymer. The catalyst that is needed to achieve a high molecular weight can be added after the esterification reaction, or it can be conveniently charged with the reactants at the beginning of the reaction. Catalysts that are useful for making a high molecular weight polymer directly from the diacid and the diols include the acetate or other alkanoate salts of Co(II) and Sb(III), oxides of Sb(III) and Ge(IV), and $Ti(OR)_4$ (where R is an alkyl group having 2 to 12 carbon atoms). Glycol solubilized oxides of these metal salts may also be used. The use of these and other catalysts in the preparation of polyesters is well known in the art.

The reaction may be carried out in discrete steps, but this is not necessary. In practice on a large scale, it may be carried out in steps as the reactants and intermediate products are pumped from reactor to reactor at increasing temperatures. In a batch process, the reactants and catalyst may be charged to a reactor at room temperature and then gradually heated to about 285° C. as polymer forms. The pressure is vented in the range of about 200° C. to about 250° C., and a vacuum is then desirably applied.

Esterification to form diol adducts of diacid esters and oligomers takes place at elevated temperatures (between room temperature and about 220° C. to 265° C. under autogenous pressure), and polymer is made at temperatures in the range of about 275° C. to about 285° C. under a high vacuum (less than 10 Torr, preferably less than 1 Torr). The vacuum is needed to remove residual diol and water vapor from the reaction to raise the molecular weight.

The progress of the polymerization can be followed by the melt viscosity, which is easily observed by the torque that is required to maintain stirring of the molten polymer.

Solid State Polymerization

Polymers can be made by the melt condensation process described above having adequate inherent viscosity for many applications. Solid state polymerization may be used to achieve even higher inherent viscosities (molecular weights).

The product made by melt polymerization, after extruding, cooling, and pelletizing, may be essentially non-crystalline. Non-crystalline material can be made semi-crystalline by heating it to a temperature above the glass transition temperature for an extended period of time. This induces crystallization so that the product can then be heated to a higher temperature to raise the molecular weight.

The polymer may also be crystallized prior to solid state polymerization by treatment with a relatively poor solvent for polyesters which induces crystallization. Such solvents reduce the glass transition temperature (Tg) allowing for crystallization. Solvent induced crystallization is known for polyesters and is described in U.S. Pat. Nos. 5,164,478 and 3,684,766, which are incorporated herein by reference.

The semi-crystalline polymer is subjected to solid state polymerization by placing the pelletized or pulverized polymer into a stream of an inert gas, usually nitrogen, or under a vacuum of 1 Torr, at an elevated temperature, but below the melting temperature of the polymer for an extended period of time.

Additives

It should, of course, be apparent to those skilled in the art that other additives may be included in the present compositions. These additives include plasticizers; pigments; flame retardant additives, particularly, decabromodiphenyl ether and triarylphosphates, such as triphenylphosphate; reinforcing agents, such as glass fibers; thermal stabilizers; ultraviolet light stabilizers processing aids, impact modifiers, flow enhancing additives, nucleating agents to increase crystallinity, and the like. Other possible additives include polymeric additives including ionomers, liquid crystal polymers, fluoropolymers, olefins including cyclic olefins, polyamides, ethylene vinyl acetate copolymers and the like.

This invention is further illustrated by the following non-limiting examples.

EXAMPLES

The polymer molecular weights are estimated based on inherent viscosity (I.V.), which is measured for a 1% solution (wt./volume) of polymer in o-chlorophenol at a temperature of 25° C. The levels of catalyst components are expressed as ppm, based on a comparison of the weight of the metal with the weight of either the diacid or dimethyl ester, depending on which monomer is used.

The following examples describe the polymerization of terephthalate copolymers of 1,4-butanediol and isosorbide (PBI(x)T), where (x) specifically refers to the amount of isosorbide expected in the polymer if 100% incorporation is achieved. For example, a PBI(10)T refers to a polymerization where a polymer composition of 50% dimethyl terephthalate/40% butanediol/10% isosorbide is expected if all the isosorbide charged to the reactor is incorporated into the polymer.

Example 1

A 2 liter volume, 3 necked, cylindrical walled round bottom glass flask, was fitted with a jacketed Vigreaux column, distillation head, nitrogen inlet, and a stainless steel C type stirring shaft, connected to a Cole Parmer Master Servodyne stirrer motor. The flask was charged with 780.1 g dimethyl terephthalate (DMT), 117.6 g isosorbide (ISOS), and 833.3 g 1,4-butanediol (BD). The flask and contents were purged with nitrogen, then 0.84 g of titanium (IV) butoxide was added. The flask was placed in a fluidized sand bath and the temperature of the bath was controlled with a time/temperature programmable controller. The temperature of the flask contents were raised from 25° C. to 135° C. over a 50 minute period, then from 135° C. to 200° C. over 50 minutes, held at 200° C. for 30 minutes, increased to 220° C. over a period of 30 minutes, then to 250° C. over 90 minutes, and finally held at 250° C. for 120 minutes. Transesterification of the reactant diols with dimethyl terephthalate began as the reaction temperature approached 180° C. and 200 ml of distillate was collected as the reaction mixture reached 185° C., and 300 ml was collected when the reactants reached 205° C. When the reaction mixture reached 225° C., the distillate receiver was replaced with a vacuum receiver and the pressure in the reaction vessel was lowered from atmospheric to 1 Torr over a period of 1 hour while collecting additional distillate. The reaction continued to build molecular weight as judged by the increase in torque recorded from the millivolt meter of the Master Servodyne Stirrer controller. After 3 hours and 45 minutes under vacuum the torque had increased 85 millivolts and the reaction was terminated by allowing the flask to fill with nitrogen to obtain atmospheric pressure. After cooling to room temperature, the glass flask was broken and removed from the polymer. The polymer was cut with a band saw and ground in a Wiley Mill. The ground polymer was analyzed for composition, with proton NMR, molecular weight by inherent viscosity (IV), and thermal characterization by DSC, including glass transition temperature (Tg), melting temperature (peak of endotherm (Tmp), and the end temperature of the melting endotherm (Tm)) and the heat of fusion ($\Delta H$). The data from the analysis of this polymer is found in Table 1.

Examples 2–7

Examples 2–7 were made in essentially the manner as Example 1, except for the amount of isosorbide added to the reaction mixture. The data for Examples 2–7 are found in Table 1.

TABLE 1

Terephthalate Copolymers of Isosorbide and 1,4-Butanediol

| Example # | Polymer | Tg, ° C. | Tmp/ Tm/$\Delta H$, ° C./° C./J per g | I.V., DL/g | NMR Analysis of Polymer, Mole % | | |
|---|---|---|---|---|---|---|---|
| | | | | | Iso-sorbide | DMT | Butane-diol |
| Control | PBT | 45 | 224/234/41 | 0.66 | 0 | 50.4 | 49.6 |
| 1 | PBI(10)T | 52 | 212/223/47 | 0.59 | 4 | 50.2 | 45.2 |
| 2 | PBI(2.5)T | 45 | 221/231/55 | 0.64 | 1.6 | 49.9 | 48.5 |
| 3 | PBI(5)T | 49 | 219/231/49 | 0.29 | 3.4 | 48.5 | 48.1 |
| 4 | PBI(10)T | 49 | 215/229/47 | 0.45 | 3.3 | 49.5 | 47.2 |
| 5 | PBI(10)T | 47 | 218/227/51 | 0.57 | NM | NM | NM |
| 6 | PBI(15)T | 62 | 201/214/32 | 0.38 | NM | NM | NM |
| 7 | PBI(25)T | 60 | 176/190/4 | 0.21 | NM | NM | NM |

The following examples describe the polymerization of polymers of dimethyl terephthalate (DMT), ethylene glycol (EG), isophthalic acid (IA) and isosorbide (Isos) (PEI(x)T/IA(y)), where (x) specifically refers to the amount of isosorbide expected in the polymer if 100% incorporation is achieved, and (y) refers to the amount of isophthalic acid expected in the polymer if 100% incorporation is achieved. For example, a PEI(2)T/IA(1) refers to a polymerization where a polymer composition of 49% DMT/48% ethylene glycol/2% isosorbide/1% isophthalic acid is expected if all the isosorbide charged to the reactor be incorporated into the polymer.

Example 8

The apparatus described in example 1 was charged with 761.2 g of dimethyl terephthalate, 23.4 g of isosorbide, 553.6 g of ethylene glycol, 0.306 g of manganese (II) acetate, 0.206 g of Cobalt (II) acetate, and 0.342 g of antimony (III) oxide. The reaction time/temperature profile was essentially the same as for example 1 except that the final temperature was 280° C. A total of 350 ml of distillate was collected by the time the reaction mixture reached 240° C., at which time 1.925 g of a solution of polyphosphoric acid in ethylene glycol, containing 3.4 wt % phosphorous, was added along with 13.3 g of isophthalic acid to the reaction vessel. The distillate receiver was replaced with a vacuum receiver and the pressure in the reaction vessel was lowered from atmospheric to 1 Torr over a period of 1 hour while collecting additional distillate. The reaction continued to build molecular weight as judged by the increase in torque recorded from the millivolt meter of the Master Servodyne Stirrer controller. After 2 hours and 40 minutes under vacuum the torque had increased 110 millivolts and the reaction was terminated by allowing the flask to fill with nitrogen to obtain atmospheric pressure. The polymer was recovered and analyzed as in example 1. The data is found in Table 2.

TABLE 2

Polymers of Dimethyl Terephthalate, Isophthalic Acid, Isosorbide and Ethylene Glycol

| Example # | Polymer | Tg, °C. | Tmp/Tm/ΔH °C. | IV, DL/g | NMR Analysis of Polymer, Mole % | | | | |
|---|---|---|---|---|---|---|---|---|---|
| | | | | | ISOS | EG | DEG | DMT | IA |
| Control | PET/IA (1.5) | 78 | 243/259/36 | 0.52 | 0 | 48.3 | 1.5 | 48.5 | 1.6 |
| 8 | PEI(2)T/IA(1) | 80 | 242/256/38 | 0.52 | 1.4 | 46.4 | 1.8 | 49.4 | 1.1 |

The following examples describe the polymerization of terephthalate copolymers of 1,3-propanediol (PG) and isosorbide (PPI(x)T), where (x) specifically refers to the amount of isosorbide expected in the polymer if 100% incorporation is achieved. For example, a PPI(5)T refers to a polymerization where a polymer composition of 50% DMT/45% propanediol/5% isosorbide is expected if all the isosorbide charged to the reactor is incorporated into the polymer.

Example 9

A 1 liter flask, equipped as in example 1, but heated by an oil bath, was charged with 194.29 g of dimethyl terephthalate, 14.69 g of isosorbide, 167.4 g 1,3-propanediol, 0.078 g of manganese (II) acetate, 0.053 g of cobalt (II) acetate, and 0.087 g of antimony (III) oxide. When the reaction reached 250° C. 0.491 g of a solution of polyphosphoric acid in ethylene glycol, containing 3.4 wt % phosphorous, was added to the reaction mixture, and the reaction vessel was placed under vacuum. After 90 minutes the vacuum reached 1 Torr where it remained for an additional 115 minutes until the reaction was terminated by allowing the flask to fill with nitrogen to obtain atmospheric pressure. The polymer was recovered and analyzed as in example 1. The data is found in Table 3.

TABLE 3

Polymers of Dimethyl Terephthalate, 1,3-Propanediol, and Isosorbide

| Example | Polymer | Tg, °C. | Tmp/Tm/ΔH, °C./° C./J per g | I.V., dL/g | NMR Analysis of Polymer, Mole % | | |
|---|---|---|---|---|---|---|---|
| | | | | | Isosorbide | DMT | PG |
| Control | PPT | 53 | 226/236/53 | 0.3 | Consistent with PPT | | |
| 9 | PPI(5)T | 39 | 224/231/51 | 0.28 | 0.3 | 48.9 | 49.4 |

The following examples describe the polymerization of polymers of dimethyl terephthalate (DMT), ethylene glycol (EG), 1,4-cyclohexane dimethanol (C) and isosorbide (Isos) (PEC(x)TI(y)), where (y) specifically refers to the amount of isosorbide expected in the polymer if 100% incorporation is achieved, and (x) refers to the amount of 1,4-cyclohexane dimethanol expected in the polymer if 100% incorporation is achieved. For example, a PEC(5)TI(5) refers to a polymerization where a polymer composition of 50% DMT/40% ethylene glycol/5% cyclohexane dimethanol/5% isosorbide is expected if all the isosorbide charged to the reactor be incorporated into the polymer.

Example 10

A 1 liter flask, equipped as in example 1, but heated by an oil bath, was charged with 194.2 g of dimethyl terephthalate, 14.6 g of isosorbide, 128.5 g of 1,4-butanediol, 14.2 g of 1,4-cyclohexanedimethanol (30/70 cis/trans ratio), 0.078 g of manganese (II) acetate, 0.053 g of cobalt (II) acetate, and 0.087 g of antimony (III) oxide. When the reaction reached 250° C., 0.491 g of a solution of polyphosphoric acid in ethylene glycol, containing 3.4 wt % phosphorous, was added to the reaction mixture, and the reaction vessel was placed under vacuum. After 24 minutes a vacuum of 2 Torr was obtained, and vacuum was continued for an additional 170 minutes until the reaction was terminated by allowing the flask to fill with nitrogen to obtain atmospheric pressure. The polymer was recovered and analyzed as in example 1. The data is found in Table 4.

TABLE 4

Polymers of Dimethyl Terephthalate, 1,4-Cyclohexane Dimethanol, 1,4-Butanediol and Isosorbide

| Example # | Polymer | Tg, °C. | Tmp/Tm/ΔH | I.V., dL/g |
|---|---|---|---|---|
| Control | PBC(5)T | 50 | 187/206/35 | 0.4 |
| Example 10 | PBC(5)TI(5) | 48 | Not observed | 0.23 |

The following examples describe the polymerization of polymers of dimethyl 2,6-naphthalene dicarboxylate (NDC), ethylene glycol (EG), isosorbide (Isos), and optionally dimethyl terephthalate (PEI(x)N(y)T), where (x) specifically refers to the amount of isosorbide expected in the polymer if 100% incorporation is achieved, and (y) refers to the amount of naphthalene dicarboxylate expected in the polymer if 100% incorporation is achieved. For example, a PEI(10)N(45)T refers to a polymerization where a polymer composition of 5% DMT/40% ethylene glycol/10% isosorbide/45% naphthalene dicarboxylate is expected if all the isosorbide charged to the reactor be incorporated into the polymer.

Example 11

A 4 liter volume, 3 necked, cylindrical walled round bottom glass flask, was fitted with a jacketed Vigreaux column, distillation head, nitrogen inlet, and a stainless steel C type stirring shaft, connected to a Cole Parmer Master Servodyne stirrer motor. The flask was charged with 2442 g of dimethyl 2,6-naphthalene dicarboxylate (NDC), 293 g isosorbide (ISOS), 1285 g of ethylene glycol, 0.98 g manganese (II) acetate, 0.67 g cobalt (II) acetate and 1.10 g of antimony (III) oxide. The flask and contents were purged with nitrogen, and placed in a fluidized sand bath. The temperature of the bath was controlled with a time/temperature programmable controller. The temperature of the flask contents were raised from 25° C. to 150° C. over a 60 minute period, then from 150° C. to 200° C. over 60 minutes, held at 200° C. for 10 minutes, increased to 250° C. over a period of 80 minutes, then to 280° C. over 60 minutes, then to 305° C. over a 30 minute period, and finally held at 305° C. for 100 minutes. Transesterification of the reactant diols with dimethyl terephthalate began as the reaction temperature approached 180° C. and 770 ml of distillate was collected as the reaction mixture reached 206° C., and 1140 ml was collected when the reactants reached 285° C. Polyphosphoric acid (6.18 g of a solution of polyphosphoric acid in ethylene glycol, containing 3.4 wt % phosphorous) was added when the reaction reached 250° C. When the reaction mixture reached 285° C., the distillate receiver was replaced with a vacuum receiver and the pressure in the reaction vessel was lowered from atmospheric to 1 Torr over a period of 30 minutes while collecting additional distillate. The reaction continued to build molecular weight as judged by the increase in torque recorded from the millivolt meter of the Master Servodyne Stirrer controller. After 1 hour and 45 minutes under vacuum the torque had increased 95 millivolts and the reaction was terminated by allowing the flask to fill with nitrogen to obtain atmospheric pressure. After cooling to room temperature, the glass flask was broken and removed from the polymer. The polymer was cut with a band saw and ground in a Wiley Mill. The ground polymer was analyzed for composition, with proton NMR, molecular weight by inherent viscosity (IV), and thermal characterization by DSC, including glass transition temperature (Tg), melting temperature (peak of endotherm (Tmp), and the end temperature of the melting endotherm (Tm)) and the heat of fusion (ΔH). The data from the analysis of this polymer is found in Table 5.

Example 12

A 2 liter flask, equipped as described in example 11, was charged with 38.8 g of dimethyl terephthalate (DMT), 928.1 g of dimethyl 2,6-naphthalene dicarboxylate (NDC), 58.5 g of isosorbide (ISOS), 538.8 g of ethylene glycol, 0.373 g manganese (II) acetate, 0.255 g cobalt (II) acetate and 0.417 g of antimony (III) oxide. When the reactants reached 263° C., 2.314 g of a solution of polyphosphoric acid in ethylene glycol, containing 3.4 wt % phosphorous, was added to the reaction vessel. The reaction product was recovered and analyzed as in example 11. The data for this polymer is found in Table 5.

Example 13

A 2 liter flask, equipped as described in example 11, was charged with 737.9 g of dimethyl terephthalate (DMT), 48.8 g of dimethyl 2,6-naphthalene dicarboxylate (NDC), 58.5 g of isosorbide (ISOS), 513.9 g of ethylene glycol, 0.316 g manganese (II) acetate, 0.216 g cobalt (II) acetate and 0.353 g of antimony (III) oxide. When the reactants reached 258° C., 1.96 g of a solution of polyphosphoric acid in ethylene glycol, containing 3.4 wt % phosphorous, was added to the reaction vessel. The reaction product was recovered and analyzed as in example 11. The data for this polymer is found in Table 5.

TABLE 5

Polymers of Dimethyl 2,6-Naphthalene Dicarboxylate, Ethylene Glycol, Isosorbide, and Optionally Dimethyl Terephthalate

| Example # | Polymer | Tg, ° C. | Tmp/Tm/ΔH, ° C./° C./J per g | I.V., DL/g | NMR Analysis of Polymer | | | | |
|---|---|---|---|---|---|---|---|---|---|
| | | | | | ISOS | EG | DEG | NDC | DMT |
| Control | PEN | 117 | 260/272/24 | 0.34 | Consistent with Spectrum of PEN | | | | |
| 11 | PEI(10)N | 121 | Not observed | 0.25 | 65 | 37.2 | 5.6 | 50.6 | 0 |
| Control | PEN(45)T | 113 | Not observed | 0.44 | 0 | 45.4 | 4.5 | 45.3 | 4.8 |
| 12 | PEI(10)N(45)T | 121 | Not Observed | 0.38 | 1.9 | 42.5 | 4.6 | 48.2 | 2.8 |
| 13 | PEI(10)N(5)T | 84 | 218/229/1 | NM | NM | NM | NM | NM | NM |

Example 14

The following polymerization reactants are added to a 4-liter polymerization flask fitted with a jacketed Vigreux column with air cooling, a mechanical stirrer, and a water-cooled condenser: dimethyl terephthalate (780.133 g), isosorbide (70.531 g), and ethylene glycol (531.211 g). The reactants are present in a mole ratio of 1:0.12:2.13, respectively. The catalyst is also charged and consists of Mn(II) acetate tetrahydrate (0.296 g), Co(II) acetate tetrahydrate (0.214 g), and Sb(III) oxide (0.350 g). This corresponds to 85 ppm manganese (weight of metal as a fraction of the weight of dimethyl terephthalate), 65 ppm cobalt, and 375 ppm antimony. The flask is purged with a stream of nitrogen while the temperature is raised to 150° C. over a period of one hour, using a fluidized sand bath as a heating medium. At this time, the nitrogen purge is stopped and the evolution of methanol commences. Methanol is continuously collected as the reaction is further heated to 250° C. over the course of approximately 2 hours. By noting when the temperature drops at the top of the Vigreux column it is possible to determine the end of methanol evolution, indicating the finish of the first step of the reaction, which is the transesterification of the diols and dimethyl terephthalate. At this point, 82 ppm of phosphorous is added in the form of a polyphosphoric acid solution in ethylene glycol. In this case, 1.854 g of the solution, which has a concentration of 10.91 g P per 100 of polyphosphoric acid solution is used. Heating is continued. The reaction is heated to 285° C. over a period of about 2 hours. Vacuum is then applied. Alternatively vacuum can be applied gradually after the polyphosphoric acid solution is added, which allows the heating to 285° C. to proceed faster, and thus requires a shorter time (about 12 hours). During this time, ethylene glycol distills off, and a low molecular weight polymer forms. Once the reaction reaches 285° C., it is placed under vacuum if it has not already been placed under vacuum. It is preferred to achieve a vacuum of less than 1 Torr. The molten polymer is heated under vacuum at 285° C. for about 2 hours, until the polymer achieves sufficient melt viscosity, as determined by an increase in torque of the stirrer. When sufficient viscosity is achieved, the polymerization is stopped, and the flask is removed from the sand bath.

The molten polymer is extruded and pelletized, or the cooled polymer is removed from the flask and ground. The chopped, ground or pelletized polymer is laid out on an aluminum pan in an oven. Under a nitrogen stream, the polymer is heated to 115° C. over a period of 4 hours and then held at that temperature for another 6 hours. This allows the polymer flake to partially crystallize. After this treatment, the polymer is placed in a stream of nitrogen and heated, again over a period of 4 hours, to 190°–195° C. and held at this elevated temperature for another 12 hours. This effects a solid-state polymerization and allows the molecular weight to be significantly increased, as judged by the inherent viscosity (I.V.) of the polymer solution in orthochlorophenol. The solution I.V. of the material increases from about 0.5 dL/g to about 0.7 dL/g during the solid state polymerization.

The monomer unit composition of the polymer, determined by proton NMR, is about 3% isosorbide, 46% ethylene glycol, 1% diethylene glycol, and 50% terephthalic acid, all expressed as a mole % of the polymer. It is noteworthy that the amount of isosorbide in the polymer is approximately half of the amount that was charged, when compared with the amount of terephthalic acid. Unreacted isosorbide was found in the distillates, especially in the ethylene glycol. The amount of isosorbide in the polymer by this process thus is very dependent on the efficiency of the distillation or other separation methods that are used in the process. A skilled practitioner can readily establish specific process details according to the characteristics of the reactor, distillation columns, and the like.

Example 15

The following monomers are added to a 5-gallon reactor: terephthalic acid, 8,638.9 g; isosorbide, 911.9 g; and ethylene glycol, 3,808.5 g. The reactants are present in a mole ratio of 1:0.12:1.18, respectively. Catalyst components are also added at this time, as follows: Co(II) acetate tetrahydrate, 1.825 g; and Sb(III) oxide; 3.103 g. The catalyst amounts correspond to 50 ppm cobalt and 275 ppm antimony, expressed as the weight of metal compared with the weight of terephthalic acid. The polymerization reactor is equipped with a fractional distillation column and a stirrer. The reactor is purged with nitrogen and then closed under 50 psig of nitrogen pressure. The temperature is raised to 265° C. over a period of about five hours while the reactants are stirred. The pressure increases to 70 psig during this time, as esterification takes place. At the end of this time period, the pressure is vented back to 50 psig. Water and ethylene glycol distill from the reactor. The temperature is maintained at 265° C. Within an hour, the contents of the reactor are a clear, viscous melt.

The excess pressure in the reactor is then vented. A solution of ethylene glycol and polyphosphoric acid (3.45 weight % phosphorous) is pumped into the reactor. This corresponds to about 50 ppm phosphorous (weight of phosphorous compared with the weight of terephthalic acid). The reactor is then placed under vacuum, while the reactor is heated to the polymerization temperature of 285° C. The distillation of water and excess diol continue. An ultimate vacuum of 1 Torr is reached within an hour. Polymerization and distillation continue for an additional 2–3 hours, at which time the torque of the stirrer reaches a pre-determined level. The polymerization is stopped, and the molten polymer is extruded from the reactor, cooled, and chopped.

This polymer is nearly identical to the polymer made in Example 14 before solid state polymerization. It has an inherent viscosity of about 0.5 dL/g. The monomer composition of the polymer, determined by proton NMR, is as follows: terephthalic acid, 50%; isosorbide, 3%; ethylene glycol, 46%; and diethylene glycol, 1%. Its inherent viscosity is increased further from about 0.5 dL/g to about 0.7 dL/g, using the same solid state polymerization procedure as was used in Example 14.

Example 16

Purified terephthalic acid (7.48 kg), isosorbide (3.55 kg), and ethylene glycol (1.70 kg) are placed in a stainless steel stirred reactor preheated to 70° C. under nitrogen purge at atmospheric pressure. The reactor is equipped with a packed distillation column. The monomer composition corresponds to a mole ratio of terephthalic acid: ethylene glycol: isosorbide of 1:0.61:0.54. The reactor was heated to 285° C. within three hours and the reaction mixture was kept under a positive pressure of 50–60 psi. During this time, a distillate of mostly water is collected from the packed column. After the melt temperature reaches at least 275° C. and the terephthalic acid is essentially consumed, as determined by a clearing of the reaction mixture, pressure is released and germanium (IV) oxide catalyst (3.77 g) is added as a 0.10N solution in ethylene glycol. The reaction mixture is stirred for an additional 20 minutes. The pressure in the reactor is reduced to 1–2 mm of mercury for a period of 1 hour and an additional distillation fraction is collected. Afterwards, the reaction product, a viscous resin is extruded into a water bath, cut into pellets and dried in an oven. The resin has a glass transition temperature of 116° C. and an inherent viscosity of 0.43 dL/g (measured at 25° C. in a 1% (w/v) orthochlorophenol solution). The monomer composition of the polymer is measured by NMR as 49.5% terephthalate, 30.3% ethylene glycol residue, 2.0% diethylene glycol residue, and 18.2% isosorbide residue, expressed as a mole % of the polymer.

Example 17

Dimethyl terephthalate (10.68 kg), isosorbide (5.79 kg), ethylene glycol (4.88 kg), manganese (II) acetate (4.76 g) are placed in a stainless steel stirred reactor under nitrogen purge at atmospheric pressure. The reactor is equipped with a packed distillation column. The monomer composition corresponds to a mole ratio of terephthalic acid:ethylene glycol:isosorbide of 1:1.43:0.72. The reactor is heated to 230° C. within three hours, to 240 over the next hour and to 265 over the next hour. During this time a distillate that is mostly methanol is collected from the packed column. After the temperature reaches 284° C., polyphosphoric acid is added to the reactor. The amount of polyphosphoric acid is equivalent to 402 mg of phosphorous. Germanium (IV) oxide catalyst, (4.66 g) is added as a 0.10N solution in ethylene glycol. The pressure inside the reactor is now reduced to 1 mm of mercury over a period of two hours. The reaction mixture is kept under vacuum for three more hours, and an additional distillation fraction is collected while the temperature increases to 285° C. Afterwards, the reaction product, a viscous resin is extruded into a water bath, cut into pellets and dried in an oven. The resin has a glass transition temperature of 106° C. and an inherent viscosity of 0.43 dL/g (measured at 25° C. in a 1% (w/v) orthochlorophenol solution). The monomer composition of the polymer is measured by NMR as 50.1% terephthalate, 33.5% ethylene glycol residue, 2.6% diethylene glycol residue, and 12.9% isosorbide residue, expressed as a mole % of the polymer.

Example 18

The following monomers and additives are added to a five gallon reactor, constructed of 316 stainless steel, that is equipped with a reflux column, packed with stainless 316 Pall rings, and a water cooled condenser: Dimethyl terephthalate, 11.65 Kg; isosorbide, 4.384 Kg; ethylene glycol, 3.724 Kg; manganese(II)acetate, 7.02 g; antimony oxide, 4.18 g; and 1,2,3,4-tetrahydronaphthalene, 125 ml. A nitrogen purge is placed on the reactor and the contents are heated to 250° C. within 180 minutes, then to 275° C. during the next 60 minutes. During heat up, a distillate is collected that consists mostly of methanol. When the reaction mixture reaches 270° C., polyphosphoric acid is added in an amount equivalent to 25.4 mg of phosphorous. After reaching 275° C., the pressure inside the reactor is reduced to 1–2 mm of mercury over a period of 240 minutes. The reaction mixture is kept at this pressure for 240 minutes and an additional distillate fraction is collected while the temperature is raised to 285° C. When the melt viscosity reached a predetermined level, measured by the torque required to maintain a constant agitator speed of 50 rpm, the reactor is filled with nitrogen to a pressure of 60 psi and the polymer is extruded through a 0.125 inch diameter die into a water trough. The polymer strand is chopped into pellets and dried in an oven at 100° C. for 10 hours. The polymer is found to have a glass transition of 117° C. when measured at a heating rate of 20° C. per minute. The inherent viscosity, measured in o-chlorophenol at 25° C., is 0.41 dL/g. The polymer composition, determined by proton NMR spectrometry, is 50.6% terephthalic acid moieties, 17.6% isosorbide moieties, 29.9% ethylene glycol moieties and 1.9% diethylene glycol moieties.

Example 19

The following polymerization reactants are added to a 50 gal. maximum capacity, Hastalloy B polymerization reactor fitted with a 6" radius, Hastalloy B, water cooled reflux column packed with stainless steel rings, a stainless steel helix agitator stirrer, a water-cooled condenser and by-pass: dimethyl terephthalate (78.02 kg), isosorbide (15.42 kg), and ethylene glycol (49.90 kg), which corresponds to a mole ratio of 1:0.26:2.00. The catalyst is also charged and consists of Mn(II) acetate tetrahydrate (29.57 g), Co(II) acetate tetrahydrate (21.43 g), and Sb(III) oxide (35.02 g). This corresponds to 85 ppm manganese (weight of metal as a fraction of the weight of dimethyl terephthalate), 90 ppm cobalt, and 375 ppm antimony. The stirred reactor (50 rpm) is purged with a stream of nitrogen while the temperature is raised to 250° C. over a period of four hours. The reactor is jacketted and uses a temperature controlled, hot oil loop system as a heating medium. Methanol is continuously collected as the reaction is heated above approximately 150° C. By noting when the temperature drops at the top of the packed reflux column it is possible to determine the end of methanol evolution, indicating the finish of the first step of the reaction, which is the transesterification of the diols and dimethyl terephthalate. At this point, 77 ppm of phosphorous is added in the form of a polyphosporic acid solution in ethylene glycol. In this case, 153 ml of the solution, which has a concentration of 10.91 g P per 100 g of polyphosphoric acid solution is used. Also at this time, the nitrogen purge is stopped. Heating is continued. The reaction is heated to 285° C. over a period of about 2 hours. Vacuum is then gradually applied using a multi-vane vacuum pump with 20 horsepower blower. The attainment of full vacuum, preferably less than 1 Torr, takes approximately 1 hour. During this time, ethylene glycol distills off, and a low molecular weight polymer forms. The molten polymer is heated under vacuum at 285° C. for about 2 hours, until the polymer achieves sufficient melt viscosity, as determined by an increase in torque of the stirrer. When sufficient viscosity is achieved, the polymerization is stopped, and the reactor is emptied through a heated die at the bottom. The molten polymer emerges as a strand that when cooled through immersion in a cold water trough can be chopped into pellets. The polymer pellets are dried overnight in a rotating drum heated to 120° C.

The cooled polymer is removed from the flask and ground. The solution inherent viscosity (I.V.) of the material is 0.64 dL/g.

The monomer unit composition of the polymer, determined by proton NMR, is about 6% isosorbide, 42% ethylene gylcol, 2% diethylene glycol, and 50% terephthalic acid, all expressed as a mole % of the polymer. It is noteworthy that the amount of isosorbide in the polymer is approximately half of the amount that is charged, when compared with the amount of terephthalic acid. Unreacted isosorbide is found in the distillates, especially in the ethylene glycol. The amount of isosorbide in the polymer by this process thus is very dependent on the efficiency of the distillation or other separation methods that are used in the process. A skilled practitioner can readily establish specific process details according to the characteristics of the reactor, distillation columns, and the like.

Example 20

The second example is prepared in a way similar to Example 19 except that a smaller reactor (5 gal. maximum capacity) is used. The reagent equivalent ratios are also changed in order to prepare a polymer with a greater content of isosorbide. Thus, dimethyl terephthalate (10,680 g), isosorbide (5,787 g), and ethylene glycol (4,881 g), which corresponds to a mole ratio of 1:0.72:1.43 are charged to the reactor in a similar fashion as before along with the catalyst consisting of Mn(II) acetate tetrahydrate (4.76 g), and Ge(IV) oxide (4.66 g). This corresponds to 100 ppm manganese (weight of metal as a fraction of the weight of dimethyl terephthalate) and 300 ppm germanium. The germanium oxide is added in the form of a solution in ethylene glycol (0.100 N $GeO_2$ in ethylene glycol). A solution of polyphosphoric acid in ethylene glycol is added in a similar way as before, in this case 9.6 ml, which has a concentration of 3.45 g P per 100 ml of polyphosphoric acid solution, is used. The polymerization proceeded in a similar fashion as before, however, the resultant finished resin did not achieve the same inherent viscosity within the given time. In this case a solution I.V. of 0.42 dL/g is observed. It was also observed that the monomer unit composition of the polymer, determined by proton NMR, is about 13% isosorbide, 34% ethylene gylcol, 3% diethylene glycol, and 50% terephthalic acid, all expressed as a mole % of the polymer. The extent of isosorbide incorporation is somewhat lower in this case than previously observed but reflects the efficiency of the differing reactors rather than the polymer made.

Example 21

This example is prepared in a way similar to example 14 except that a larger reactor (100 gal) equipped with a stainless steel anchor type stirrer is used. The monomers charged are such an isosorbide content in the finished polymer would be 1 mole %, assuming that some of the input isosorbide would be distilled off during polymerization. As such, dimethyl terephthalate (197 kg), isosorbide (5.12 kg), and ethylene glycol (135 kg) along with the catalysts: Mn(II) acetate tetrahydrate (72.1 g), CO(II) acetate tetrahydrate (54.1 g) and Sb(III) oxide (88.5 g) are used. This corresponds to 82 ppm manganese, 65 ppm Co, and 375 ppm Sb calculated using the same basis as in example 14. The transesterification process is carried in an analogous way as for example 14. A polyphosphoric acid solution in ethylene glycol is added such that 80 ppm of P is used to sequester the transition metals after the transesterification step and before the polycondensation as outlined in example 14. The polycondensation is also similar to the previous example. Polymer is extruded and pelletized to give clear, colorless resin.

The pelletized polymer is loaded into a tumble dryer and under a stream of nitrogen is heated to 115° C. over a period of 4 hours and then held at that temperature for another 6 hours. This allows the polymer to partially crystallize. After this treatment, a vacuum is applied to the tumble dryer ulitmately achieving a vacuum less than 1 mm of Hg. The heating is continued and reaches a maximum of 213° C. It is then held at this elevated temperature for a total of approximately 15 hours. This effects a solid-state polymerization and allows the molecular weight to be significantly increased, as judged by the inherent viscosity (I.V.) of the polymer solution in ortho-chlorophenol. The solution I.V. of the material increases from about 0.5 dL/g to about 0.7 dL/g during the solid state polymerization.

Example 22

This polymer is prepared in a similar way to that for example 21 except that the amounts of diols were changed in order to result in a resin with a somewhat increased isosorbide content. Thus, the only alterations are in the amount of isosorbide charged, 17.8 kg, and the amount of Mn(II) acetate tetrahydrate catalyst used, 79.2 g corresponding to 90 ppm Mn(II) calculated on the same basis as in the above example. The transesterification and polycondensation are repeated as described in example 21. Also, the finished polymer is pelletized, crystallized, and solid-state polymerized in an identical fashion to the previous example. This results in a polymer with approximately 3 mole % isosorbide content.

Example 23

This example describes a blend of isosorbide containing polymers with nucleating agents and glass fiber. The purpose of nucleating agents is to increase crystallinity and thereby improve the thermal resistance (heat deflection temperature) of the blends. The polymer of examples 19, 20, and 22 are blended together with the nucleating agent sodium bicarbonate (Aldrich) and glass fiber type OCF 183 (PPG, Pittsburgh, Pa.) using the Leistritz brand extruder (Model MC 1866/GL, Leistritz AG). Then, the blends are injection molded into test parts using the Arburg molding machine as described in example 18. The molded parts (Examples 23a–c) are heat treated in an oven at 130° C. for 30 minutes. The compositions and results are summarized below.

TABLE 6

| ASTM test method | Composition(weight %) | Example 23a | Example 23b | Example 23c | Example 23d | Example 23e |
|---|---|---|---|---|---|---|
| | PEIT-3 | 70 | 0 | 0 | 70 | 0 |
| | PEIT-6 | 0 | 70 | 0 | 0 | 70 |
| | PEIT-13 | 0 | 0 | 70 | 0 | 0 |
| | OCF-183 | 29.6 | 29.6 | 29.6 | 30 | 30 |
| | sodium bicarbonate | 0.4 | 0.4 | 0.4 | 0 | 0 |
| D638 | tensile modulus(Mpsi) | 1.19 | 1.26 | 1.26 | 1.28 | na |
| D638 | tensile elong @ bk(%) | 1.94 | 1.85 | 1.29 | 2.55 | na |
| D638 | tensile stress @ bk(Ksi) | 15.6 | 16.9 | 12.8 | 16.6 | na |
| D256 | Notched Izod (ft-lb) @ 20° C. | 0.82 | 1.19 | 2.17 | 1.33 | 1.93 |
| D3763 | Multiaxial impact load(lb) @ max. load (20° C.) | 296 | 305 | 287 | 236 | 265 |
| D3763 | Multiaxial impact load(lb) @ max. load (−20° C.) | 314 | 302 | 294 | na | na |
| D3763 | Multiaxial impact load(lb) @ max. load (−40° C.) | 315 | 321 | 287 | na | na |
| D648 | HDT(° C.) @ 264 psi | 136 | 147 | 106 | 81 | 88 |

It is to be understood that the above described embodiments are illustrative only and that modification throughout may occur to one skilled in the art. Accordingly, this invention is not to be regarded as limited to the embodiments disclosed herein.

What is claimed is:

1. A method for making a polyester polymer comprising:
   (1) combining in a reactor one or more monomers comprising a diacid moiety; a monomer comprising an isosorbide moiety; and one or more monomers comprising another diol moiety; with a condensation catalyst suitable for condensing diacids and diols; and
   (2) heating said monomers and said catalyst to a temperature sufficient to polymerize said monomers into a polyester polymer having at least said diacid moieties, said isosorbide moieties and said other diol moieties;
   wherein said heating is continued for a sufficient time to yield an isotropic polyester having an inherent viscosity of at least about 0.15 dL/g when measured as a 1% (weight/volume) solution of said polyester in o-chlorophenol at a temperature of 25° C. and with the proviso that when said one or more monomers comprising a diacid moiety is terephthalic acid or dimethyl terephthalate, said one or more monomers comprising another diol moiety is not ethylene glycol or is ethylene glycol and a different diol.

2. The method according to claim 1, wherein said diacid moiety is an aromatic or alicyclic diacid moiety.

3. The method according to claim 1, wherein said other diol moiety is an aliphatic or alicyclic diol moiety.

4. The method according to claim 1, wherein said process further includes stirring of said monomers during said heating and the concurrent removal of by-products by distillation and/or evaporation.

5. The method according to claim 1, wherein water and unreacted monomer are removed while said monomers polymerize.

6. The method according to claim 1, wherein methanol and unreacted monomer are removed while said monomers polymerize.

7. The method according to claim 1, wherein said process further comprises adding an additive to said process to help retain volatile components.

8. The method according to claim 7, wherein said additive is tetrahydronapthalene.

9. The method according to claim 1, wherein said one or more monomers comprising another diol moiety are selected from the group consisting of aliphatic alkylene glycols and branched aliphatic glycols having from 2–12 carbon atoms and having the empirical formula HO—$C_nH_{2n}$—OH, where n is an integer from 2–12; cis and trans-1,4-cyclohexanedimethanol and mixtures thereof; triethylene glycol; 2,2-bis[4-(2-hydroxyethoxy)phenyl] propane; 1,1-bis[4-(2-hydroxyethoxy)phenyl]cyclohexane; 9,9-bis[4-(2-hydroxy-ethoxy)-phenyl]fluorene; 1,4:3,6-dianhydromannitol; 1,4:3,6-dianhydroiditol; and 1,4-anhydroerythritol.

10. The method according to claim 1, wherein said one or more monomers comprising a diacid moiety are selected from the group consisting of isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid.

11. The method according to claim 1, wherein said monomers are included in amounts such that said diacid moieties are present in an amount of about 50 mole % of said polyester, and said diol moieties are present in an amount of about 10 mole % to about 49.75 mole % of said polyester.

12. The method according to claim 1, further comprising increasing the molecular weight of said polyester by solid state polymerization.

13. The method according to claim 12, wherein said solid state polymerization comprises:
a) crystallizing said polyester by heating said polyester to a temperature in the range of about 115° C. to about 140° C. or treating said polyester with a solvent which reduces the glass transition temperature of the polyester allowing for crystallization; and
b) heating said polyester under vacuum or in a stream of inert gas at an elevated temperature above about 140° C. but below the melting temperature of said copolyester to yield a copolyester having an increased inherent viscosity.

14. The method according to claim 13, wherein said heating step (b) is carried out at a temperature of about 195° to about 1 98° C. for about 10 hours.

15. The method according to claim 13, wherein said inherent viscosity is increased to at least about 0.65 dL/g.

16. The method according to claim 13, wherein said polyester comprises from about 0.25 mole % to about 10 mole % isosorbide moieties.

17. An isotropic polyester comprising diacid moieties, isosorbide moieties, and one or more other diol moieties, wherein said polyester has an inherent viscosity of at least about 0.15 dL/g when measured as a 1% (weight/volume) solution of said polyester in o-chlorophenol at a temperature of 25° C. and with the proviso that when said diacid moieties are derived from terephthaloyl, said one or more other diol moieties is not derived from ethylene glycol or is derived from ethylene glycol and another diol.

18. The isotropic polyester according to claim 17, wherein said inherent viscosity is at least about 0.35 dL/g.

19. The isotropic polyester according to claim 18, wherein said inherent viscosity is at least about 0.5 dL/g.

20. The isotropic polyester according to claim 19, wherein said inherent viscosity is at least about 0.65 dL/g.

21. The isotropic polyester according to claim 17, wherein said other diol moieties are present in an amount of about 10 mole % to about 49.75 mole % of the polyester, and said isosorbide moieties are present in an amount of about 0.25 mole % to about 40 mole % of the polyester.

22. The isotropic polyester according to claim 17, wherein said one or more other diol moieties are derived from aliphatic alkylene glycols or branched aliphatic glycols having from 2–12 carbon atoms and having the empirical formula HO—$C_nH_{2n}$—OH, where n is an integer from 2–12; cis or trans-1,4-cyclohexanedimethanol or mixtures thereof; triethylene glycol; 2,2-bis[4-(2-hydroxyethoxy) phenyl]propane; 1,1-bis[4-(2-hydroxyethoxy)-phenyl] cyclohexane; 9,9-bis[4-(2-hydroxyethoxy)phenyl]fluorene; 1,4:3,6-dianhydromannitol; 1,4:3,6-dianhydroiditol; or 1,4-anhydroerythritol.

23. The isotropic polyester according to claim 17, wherein said one or more diacid moieties are derived from isophthalic acid, 2,5-furandicarboxylic acid, 2,5-thiophenedicarboxylic acid, 2,6-naphthalenedicarboxylic acid, 2,7-naphthalenedicarboxylic acid, or 4,4'-bibenzoic acid.

24. The isotropic polyester according to claim 17, wherein said diacid moieties are present in an amount of about 50 mole % of said polyester, said other diol moieties are present in an amount of about 10 mole % to about 49.75 mole % of said polyester, and said isosorbide moieties are present in an amount of about 0.25 mole % to about 40 mole % of said polyester.

25. The isotropic polyester according to claim 24, wherein said other diol moieties are derived from cis-1,4-cyclohexanedi-methanol, trans-1,4-cyclohexanedimethanol, or mixtures thereof.

26. The isotropic polyester according to claim 17, wherein said diacid moieties are derived from a 2,6-naphthalenedioyl, terephthaloyl, isophthaloyl or 4,4'-bibenzoyl.

27. The isotropic polyester according to claim 26, wherein said polyester is polyethylene, polybutylene or polypropylene 2,6-naphthalene dicarboxylate containing isosorbide moieties.

28. The isotropic polyester according to claim 26, wherein said polyester is polyethylene, polybutylene or polypropylene terephthalate containing isosorbide moieties.

29. The isotropic polyester according to claim 26, wherein said polyester is polyethylene, polybutylene or polypropylene isophthalate containing isosorbide moieties.

30. The isotropic polyester according to claim 26, wherein said polyester is polyethylene, polybutylene or polypropylene 4,4'-bibenzoate containing isosorbide moieties.

31. The isotropic polyester according to claim 26, wherein said diol moiety is derived from ethylene glycol; 1,4-butylene glycol; 1,3-propylene glycol or 1,4-cyclohexanedimethanol.

32. A film or sheet made of the composition defined by claim 17.

33. A beverage bottle made of the composition defined by claim 17.

34. A fiber made of the composition defined by claim 17.

35. An optical article made of the composition defined by claim 17.

36. The optical article of claim 35, wherein said optical article is a compact disc, digital versatile disc or substrate for compact disc or digital versatile disc.

* * * * *